(12) United States Patent
Inoue et al.

(10) Patent No.: US 8,294,427 B2
(45) Date of Patent: Oct. 23, 2012

(54) BATTERY CHARGER FOR MULTIPLE MOBILE DEVICES

(75) Inventors: Takahiro Inoue, Sapporo (JP); Shogo Ito, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 412 days.

(21) Appl. No.: 12/060,548

(22) Filed: Apr. 1, 2008

(65) Prior Publication Data

US 2008/0265836 A1    Oct. 30, 2008

(30) Foreign Application Priority Data

Apr. 26, 2007 (JP) ................................. 2007-117202

(51) Int. Cl.
*H02J 7/00* (2006.01)
(52) U.S. Cl. ........ 320/137; 320/114; 320/124; 320/132; 320/134; 320/136
(58) Field of Classification Search .................. 320/114, 320/137
See application file for complete search history.

(56) References Cited

U.S. PATENT DOCUMENTS

| 5,136,620 | A | * | 8/1992 | Eaves | 377/15 |
| 5,321,627 | A | * | 6/1994 | Reher | 702/63 |
| 7,394,224 | B2 | * | 7/2008 | Wanibuchi et al. | 320/149 |
| 7,518,340 | B2 | * | 4/2009 | Sterz et al. | 320/132 |
| 2001/0010456 | A1 | * | 8/2001 | Kaite et al. | 320/125 |
| 2004/0145342 | A1 | | 7/2004 | Lyon | |
| 2005/0001590 | A1 | * | 1/2005 | Bayne et al. | 320/128 |
| 2005/0200332 | A1 | | 9/2005 | Kangas | |

FOREIGN PATENT DOCUMENTS

| CN | 1505235 A | 6/2004 |
| EP | 1 427 084 A2 | 6/2004 |
| JP | 60-194730 | 10/1985 |
| JP | 8-500479 | 1/1996 |
| JP | 9-215217 | 8/1997 |
| JP | 10-143246 | 5/1998 |
| JP | 2006-34083 | 2/2006 |

OTHER PUBLICATIONS

Extended European Search Report issued Aug. 26, 2011, in Patent Application No. 08251302.9.

* cited by examiner

*Primary Examiner* — Edward Tso
*Assistant Examiner* — Johali Torres Ruiz
(74) *Attorney, Agent, or Firm* — Oblon, Spivak, McClelland, Maier & Neustadt, L.L.P.

(57) ABSTRACT

A disclosed battery charger comprises multiple interfaces provided corresponding to multiple mobile devices, the interfaces being connected to the mobile devices in wired or wireless connection; a charge parameter setting unit setting one or more charge parameters for the mobile devices; a switching control unit switching timing of charging the multiple mobile devices based on the charge parameters set by the charge parameter setting unit; and a charging unit charging one of the mobile devices selected by the switching control unit.

9 Claims, 5 Drawing Sheets

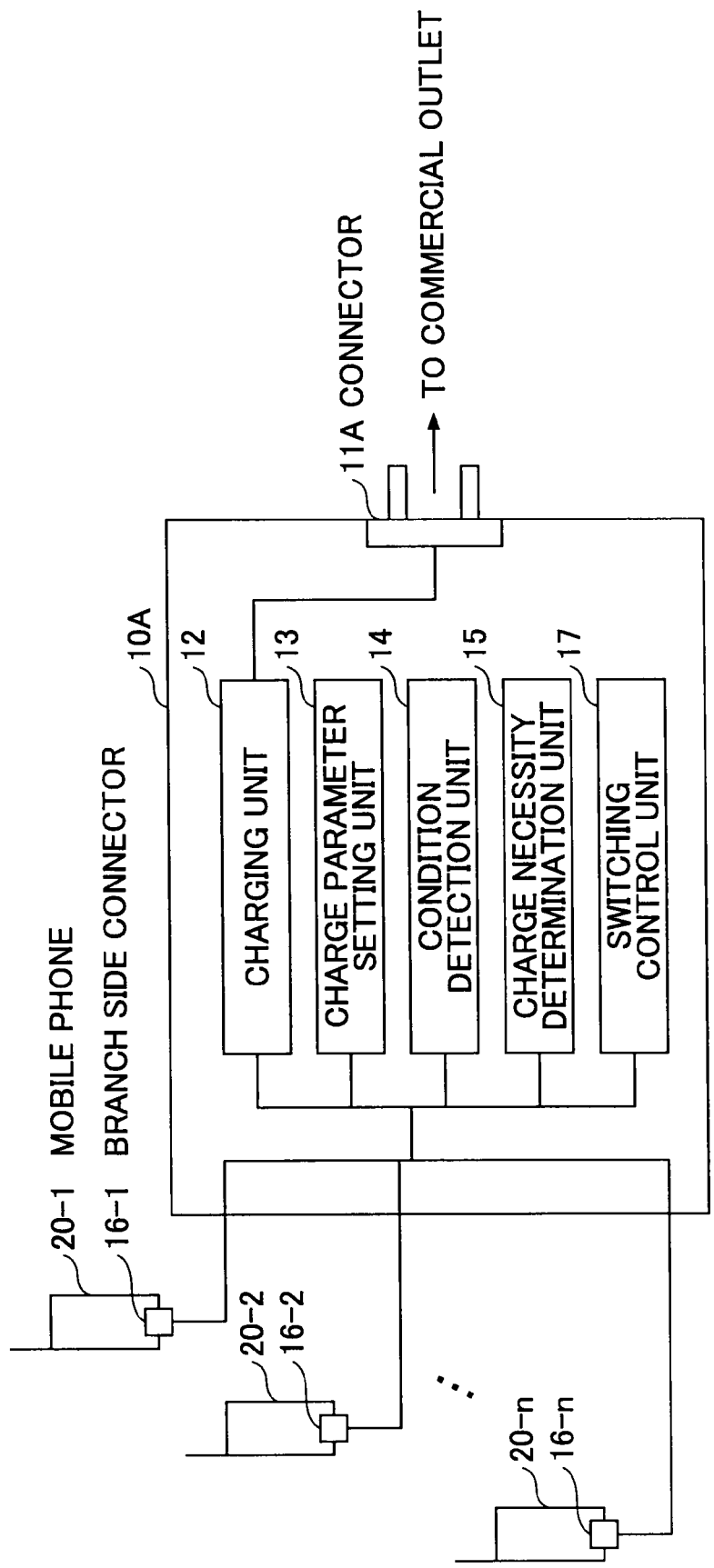

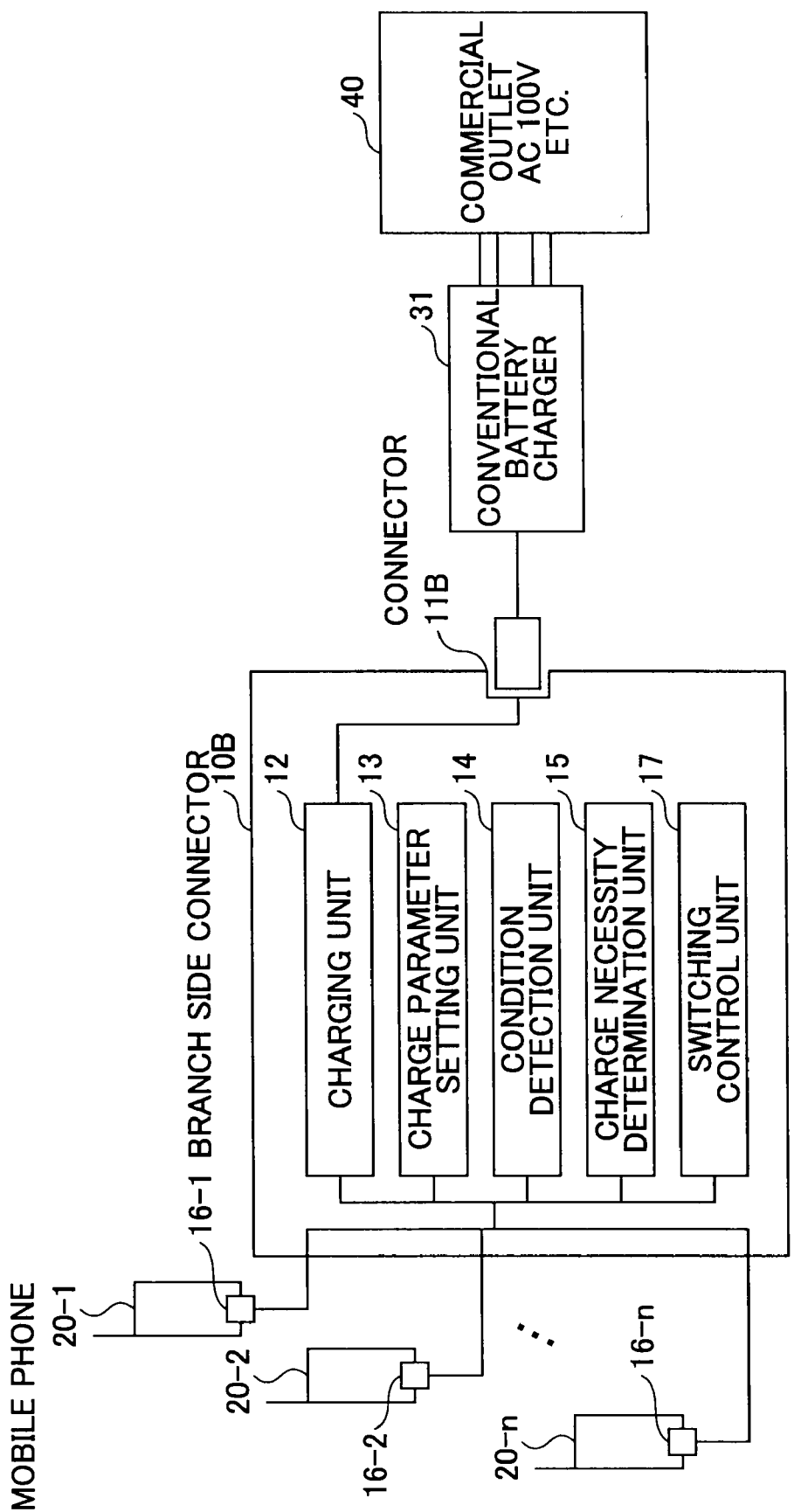

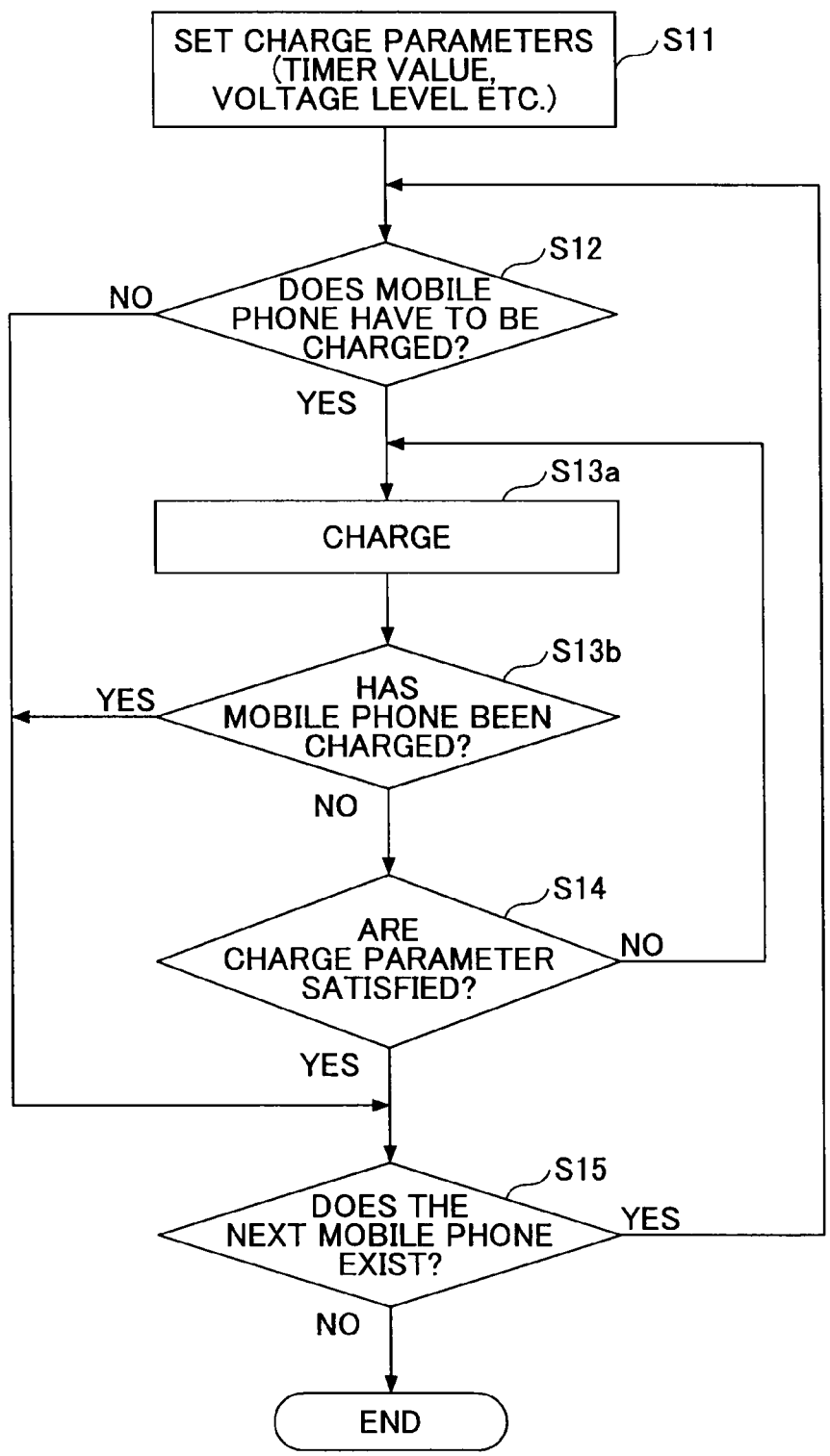

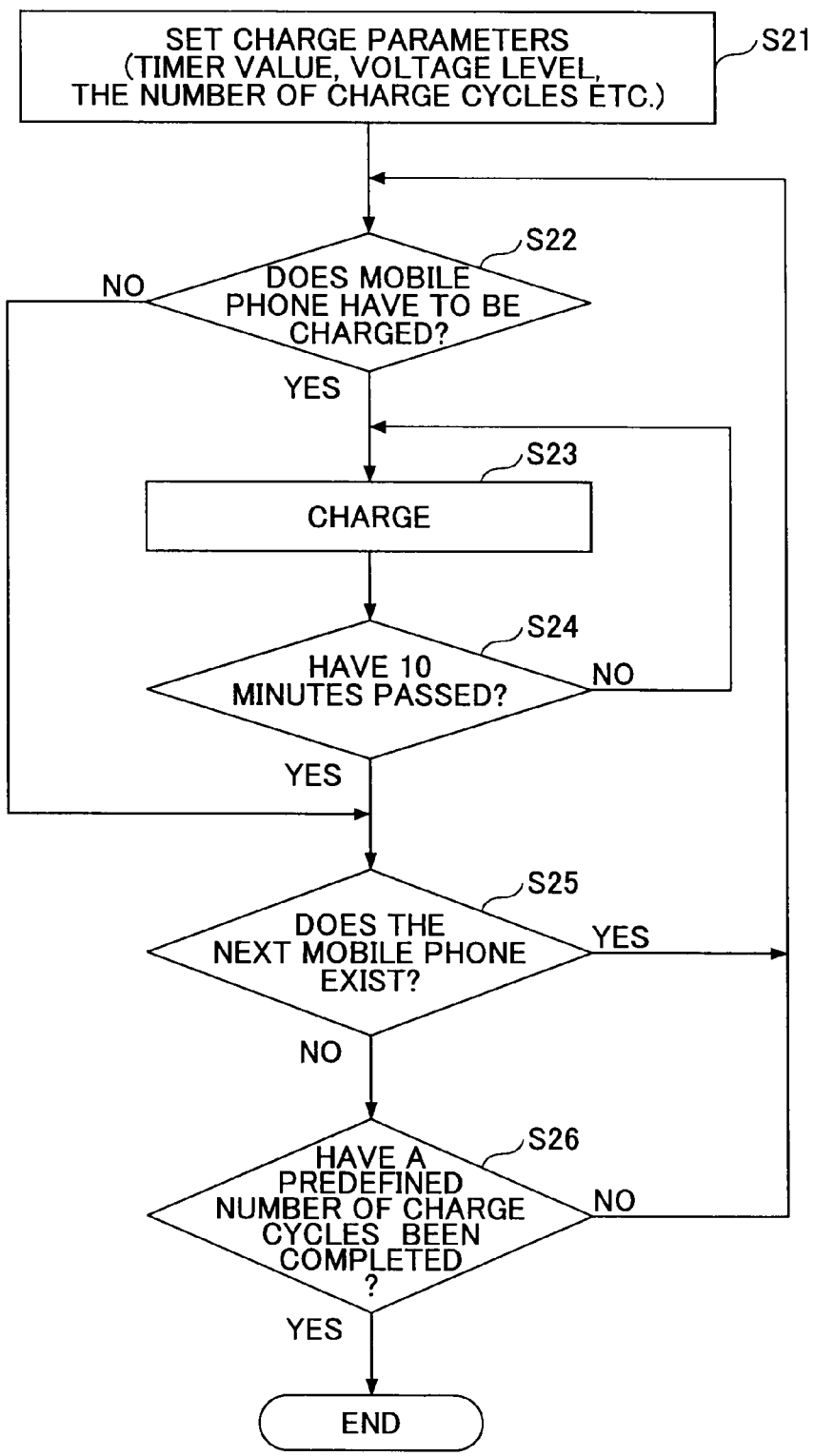

BATTERY CHARGER FOR MULTIPLE MOBILE DEVICES

BACKGROUND OF THE INVENTION

1. Field of the Invention

The present invention relates to a battery charger capable of charging the same type or different types of multiple mobile devices.

2. Description of the Related Art

In general, when one charges a mobile device such as a mobile phone or a MD player, a single battery charger corresponding to the mobile device is used to charge the mobile device. The wider prevalence of mobile devices has led to selective use of multiple mobile phones for various purposes, such as a private use phone and a business use phone, possession of one or more mobile phones by respective family members or carrying and use of different electronic devices during commuting. When one charges different products or different types of mobile devices or when family members charge respective mobile devices, they need to have different battery chargers corresponding to the respective mobile devices and multiple plugs connected to the battery chargers.

Of course, for example, a single battery charger for common use may be able to charge mobile phones manufactured by the same manufacturer even if they are of different types. If an existing common battery charger is used to charge multiple mobile phones, however, when one of the mobile phones has been charged, the mobile phone is detached from the battery charger and then the next mobile phone is connected to the battery charger for charging. This procedure must be repeated for all the mobile phones. Each time one of the mobile phones has been charged, a user must detach the charged mobile phone from the battery charger and then connect the next mobile phone to the battery charger. In addition, if the user is not aware that the mobile phone has been charged, the duration between the charging completion of the mobile phone and the connection to the next mobile phone may simply become a loss of time.

In order to avoid the above-mentioned inconvenience, some battery chargers have been proposed. For example, Japan Laid-Open Publication 2006-34083 discloses a household use battery charger that includes multiple connector cables for connecting to multiple mobile phones and is capable of charging the multiple mobile phones simultaneously. Since the battery charger can supply and distribute power required to charge the individual mobile phones connected to the connector cables simultaneously, the power amount corresponding to the number of the connected mobile phones may be required. The arrangement of simultaneously charging the multiple mobile phones via the multiple connector cables at a conventional charging speed may be equivalent to one in which an extension cord having multiple plugs is connected to a single outlet. In other words, the arrangement of simultaneously charging the multiple mobile phones via the multiple connectors may be equivalent to the arrangement in which multiple outlets are used to simultaneously charge the multiple mobile phones.

SUMMARY OF THE INVENTION

The present invention may provide a battery charger capable of charging multiple mobile devices uniformly and efficiently by means of a substantially single outlet without reduction in charge current due to distribution of the current.

According to an aspect of the present invention, multiple mobile devices can be uniformly and sequentially charged with commonly used charge current without reduction in the charge current due to distribution of the current by controlling switch timing of charging a certain mobile device over another mobile device. For example, three mobile phones A, B and C having different levels of batteries are sequentially charged by a certain amount of current in one charge cycle. When any of the mobile phones has been fully charged, the fully charged mobile phone is skipped in subsequent charge cycles and only the other mobile phones are charged.

In another aspect of the present invention, a battery charger for multiple mobile devices includes (a) multiple interfaces provided corresponding to multiple mobile devices, the interfaces being connected to the mobile devices in wired or wireless connection; (b) a charge parameter setting unit setting one or more charge parameters for the mobile devices; (c) a switching control unit switching timing of charging the multiple mobile devices based on the charge parameters set by the charge parameter setting unit; and (d) a charging unit charging one of the mobile devices selected by the switching control unit.

The charge parameter may be a charge duration, a voltage level or a current value, a number of charge cycles for charging the multiple mobile devices sequentially and so on.

In a preferred embodiment of the present invention, the battery charger may further include a condition detection unit detecting a charge condition and/or a connection condition of each of the mobile devices; and a charge necessity determination unit determining whether each of the mobile devices has to be charged based on the detected condition. When the charge necessity determination unit determines that one of the mobile devices does not have to be charged, the switching control unit may skip the mobile device and select the next one of the mobile devices.

In another embodiment of the present invention, the switching control unit may determine whether the charge parameters set by the charge parameter setting unit are satisfied, and when the charge parameters are satisfied, the switching control unit may switch over to the next one of the mobile devices.

In still another embodiment of the present invention, the battery charger may further include a charge condition detection unit detecting a charge condition of each of the mobile devices, and if the charge condition detection unit detects that a current one of the mobile devices has been fully charged, the switching control unit may switch over to the next one of the mobile devices even when the charge parameters have not been satisfied.

In the second aspect of the present invention, a method of charging multiple mobile devices is provided. The method includes (a) connecting the multiple mobile devices to a single battery charger in wired or wireless connection; (b) setting one or more charge parameters for each of the mobile devices; (c) switching timing of charging the mobile devices based on the set charge parameters; and (d) charging one of the mobile devices selected in the switching step.

According to the above-mentioned battery charger and method thereof, each of multiple mobile devices can be charged by distributing the power to the mobile devices under power control in accordance with set parameters. As a result, the power corresponding to the number of the connected mobile devices does not have to be supplied for a certain duration, resulting in less power consumption.

According to the above-mentioned battery charger and method thereof, it is possible to charge multiple mobile devices sequentially by using a proper charge voltage efficiently.

BRIEF DESCRIPTION OF THE DRAWINGS

Other objects, features and advantages of the present invention will become more apparent from the following detailed description when read in conjunction with the accompanying drawings, in which:

FIGS. 1A and 1B are schematic views of exemplary battery chargers for multiple mobile terminals according to one embodiment of the present invention;

FIG. 3 is a flowchart illustrating a second exemplary operation of a battery charger for multiple mobile terminals according to one embodiment of the present invention; and FIG. 4 is a flowchart illustrating a third exemplary operation of a battery charger for multiple mobile terminals according to one embodiment of the present invention.

DETAILED DESCRIPTION OF THE PREFERRED EMBODIMENTS

Figure 2:
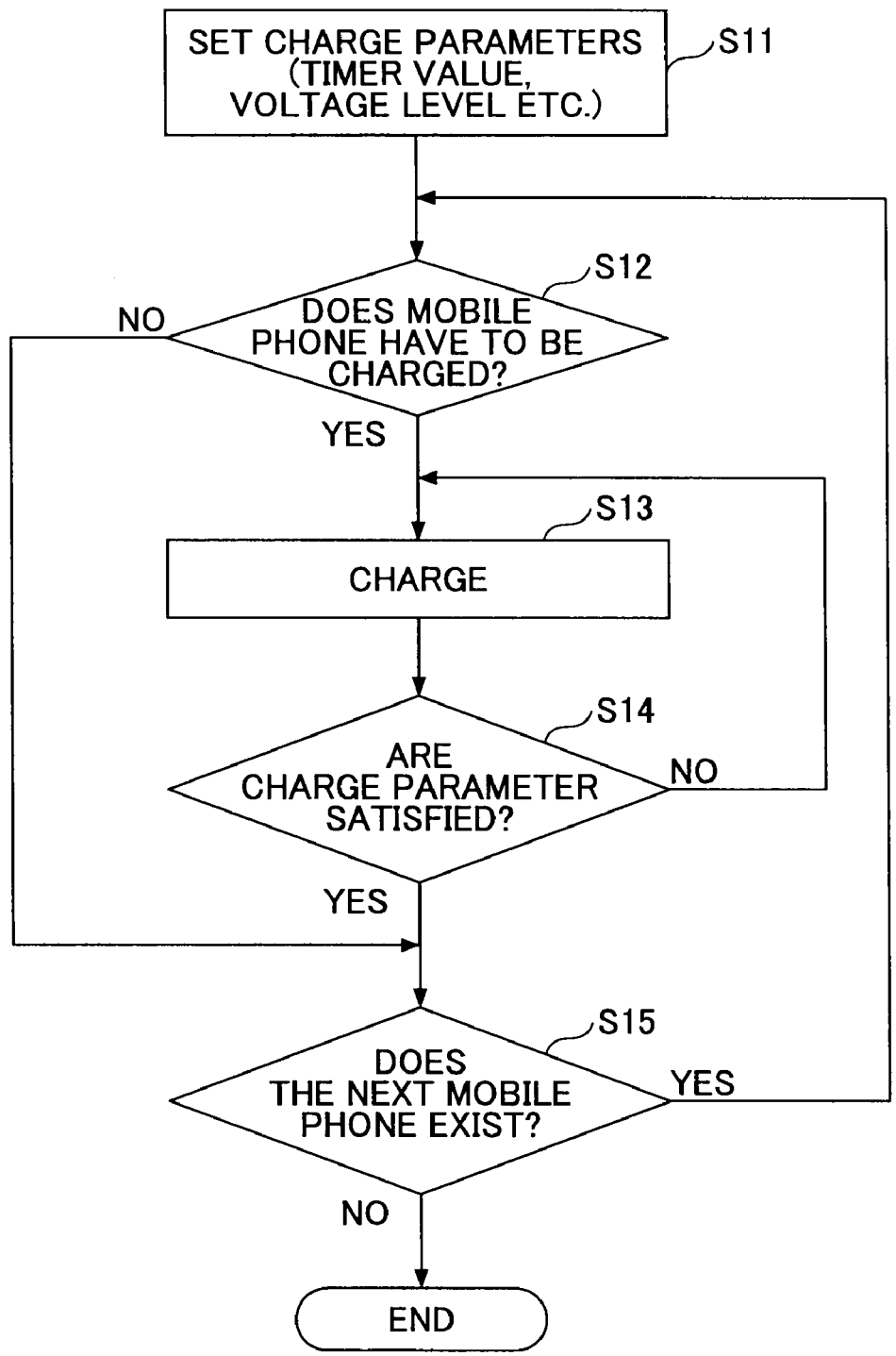
FIG. 2 is a flowchart illustrating a first exemplary operation of a battery charger for multiple mobile terminals according to one embodiment of the present invention.

Preferred embodiments of the present invention will be described in detail below with reference to the accompanying drawings.

FIGS. 1A and 1B are schematic views of battery chargers for mobile terminals according to embodiments of the present invention. FIG. 1A shows one type of battery charger 10A directly connected to a commercial outlet 40 via a connector 11A. FIG. 1B shows another type of battery charger 10B receiving power from a commercial outlet 40 via an existing battery charger 31 and a connector 11B. In these embodiments, multiple mobile phones are connected to the battery charger 10A or 10B in wired connection.

The battery charger 10A (or 10B) includes a charging unit 12, a charge parameter setting unit 13, a condition detection unit 14, a charge necessity determination unit 15 and a switching control unit 17. The battery charger 10A (or 10B) also includes branch side connectors 16-1, 16-2, . . . , 16-$n$ for connection to multiple mobile phones 20-1, 20-2, . . . , 20-$n$, respectively.

The charge necessity determination unit 15 determines based on respective connectivity and/or charge levels of the multiple mobile phones 20-1 to 20-$n$ detected by the condition detection unit 14 whether the connected mobile phones 20-1 to 20-$n$ must be actually charged. There are some cases where a mobile phone is connected to the battery charger 10A although the battery of the mobile phone is not so consumed (discharged). In these cases, the connected mobile phone may not have to be charged.

The charging unit 12 uses source voltage from the commercial outlet 40 to supply electric charges to the mobile phones. The charge parameter setting unit 13 sets one or more parameters for charging the mobile phones 20-1 to 20-$n$ sequentially based on user input or predefined fixed values. The parameters may relate to charge duration, voltage, charge cycle and so on. The switching control unit 17 controls the switch timing of charging any of the mobile phones 20 based on the set values of the parameters.

As one example, in the case where the charge duration is set to be 10 minutes as the parameters, after the mobile phone 20-1 has been charged for 10 minutes, the switching control unit 17 switches to charging the next mobile phone 20-2. In this way, each mobile phone is charged for ten minutes. After completion of the first charging of all the mobile phones 20-1 to 20-$n$, the mobile phone 20-1 is charged again for ten minutes and then the other mobile phones 20-2 to 20-$n$ are charged sequentially. In this case, the switching control unit 17 may include a timer.

As another example, it is assumed that the mobile phone 20-2 has not been so consumed and thus has been fully charged in the first 10 minutes charging. In this case, the charge necessity determination unit 15 may determine based on a detection result of the condition detection unit 14 that the mobile phone 20-2 does not have to be charged any more in subsequent charging cycles. In the subsequent charging cycles, after the mobile phone 20-1 has been charged for 10 minutes, the switching control unit 17 skips the mobile phone 20-2 and switches to the mobile phone 20-3.

As still another example, the parameter value may be set to be 3.5 V. In this case, the switching control unit 17 continues charging the mobile phone 20-1 with reference to values detected by the condition detection unit 14 until the battery voltage level of the mobile phone 20-1 reaches 3.5 V. When the battery voltage level reaches 3.5 V, the switching control unit 17 starts and continues to charge the next mobile phone 20-2 until the battery voltage level of the mobile phone 20-2 reaches 3.5 V.

As a still further example, if the set number of charge cycles is two, the switching control unit 17 switches to the next mobile phone 20-2 after the mobile phone 20-1 has been charged up to half the amount of required charge. Then, after the mobile phone 20-2 has been charged up to half the amount of required charge, the subsequent mobile phones are charged sequentially. As a result, all the mobile phones 20-1 to 20-$n$ will have been fully charged through two charge cycles.

According to the above-mentioned arrangements, the charging of multiple mobile phones can be switched through switching operations of the internal circuit. Thus, the arrangements of the present invention have the advantage of lesser power loss over conventional ones where after charge completion of each of the mobile phones, the mobile phone is detached from the connector 16 and the next mobile phone is loaded.

In addition, according to the arrangements of the present invention, even if the multiple mobile phones have different charge conditions, the multiple mobile phones can be charged uniformly through the charge voltage from the commercial outlet 40 without distribution of the current. Thus, even if a user does not have sufficient time to fully charge the multiple mobile phones, the user can take out individual mobile phones from ones charged up to some acceptable level.

Of course, the mobile phones 20 are not limited to be connected to all branch side connectors 16. Thus, the charge necessity determination unit 15 may detect connectivity of the branch side connectors 16 and then exclude one or more branch side connectors 16 not connected to any of the mobile phones 20 from being charge targets. In this case, the switching control unit 17 may skip the branch side connector 16 not connected to a mobile phone 20 and switch to the next branch side connector 16 connected to the mobile phones 20.

FIG. 2 is a flowchart illustrating a first exemplary operation of the battery charger 10A (or 10B) according to one embodiment of the present invention. At step S11, charge parameters of the battery charger 10A (or 10B) are set. The charge parameters may include a timer value for specifying how long each mobile phone should be continuously charged and a voltage level for specifying what level each mobile phone should be charged up to.

At step S12, the battery charger 10A (or 10B) determines whether the mobile phone 20-1 connected to the currently targeted branch side connector 16-1 has to be charged. If there is no mobile phone connected to the branch side connector 16-1 or if the mobile phone 20-1 connected to the branch side connector 16-1 still has sufficient battery level, the battery charger 10A (or 10B) determines that the mobile phone 20-1 does not have to be charged and then determines presence of the next mobile phone at step S15.

On the other hand, if there is a mobile phone connected to the branch side connector 16-1 and the battery charger 10A (or 10B) determines based on the connectivity and the current charge condition of the mobile phone 20-1 detected by the condition detection unit 14 that the mobile phone 20-1 has to be charged (S12: YES), the switching control unit 17 selects the branch side connector 16-1, that is, the mobile phone 20-1, to be charged by the charging unit 12 at step S13. At step S14, the battery charger 10A (or 10B) determines whether the preset charge parameters are satisfied. For example, if the timer value is set, the battery charger 10A (or 10B) may determine whether the time has expired. Alternatively, if the voltage level is set, the battery charger 10A (or 10B) may determine whether the battery voltage level of the currently charged mobile phone has reached the voltage level. The battery charger 10A (or 10B) repeats steps S13 and S14 and continues on charging the mobile phone 20-1 until the charge parameters are satisfied.

If the charge parameters are satisfied (S14: YES), the battery charger 10A (or 10B) determines presence of the next mobile phone at step S15. If the next mobile phone exists, the battery charger determines whether the mobile phone has to be charged at step S12. If it is determined that the mobile phone has to be charged (S12: YES), the switching control unit 17 switches to the next mobile phone. Then, the batter charger 10A (or 10B) repeats the above-mentioned steps S13 to S15 for the next mobile phone. After the last mobile phone has been charged at step S15, the operation ends.

FIG. 3 is a flowchart illustrating a second exemplary operation of the battery charger 10A (or 10B) according to one embodiment of the present invention. In FIG. 3, the same steps as those in FIG. 2 are designated by the same reference numerals and the description thereof will be omitted. In the operation illustrated in FIG. 3, the battery charger 10A (or 10B) determines for each mobile phone that has to be charged whether it has been fully charged in parallel with whether charge parameters are satisfied.

In other words, if it is determined that the mobile phone 20-1 connected to the current targeted branch side connector 16-1 has to be charged at step S12, the battery charger 10A (or 10B) starts to charge the mobile phone 20-1 at step S13a. Then, the condition detection unit 14 monitors the charge condition of the mobile phone 20-1 and determines whether the mobile phone 20-1 has been fully charged (S13b). At the same time, the battery charger 10A (or 10B) determines at step S14 whether the charge parameters are satisfied, for example, whether 10 minutes has passed or the battery voltage level has reached 3.5 V. If the mobile phone 20-1 has been fully charged before the charge parameters are satisfied (S13b: YES), the battery charger 10A (or 10B) proceeds to the next branch side connector 16-2 without waiting for the charge parameters being satisfied at step S15.

According to this embodiment, the battery charger 10A (or 10B) determines not only whether the set charge parameters are satisfied but also whether the currently charged mobile phone has been fully charged as described above. As a result, after completion of charge of a mobile phone 20 having a lesser consumed battery, the battery charger 10A (or 10B) can quickly switch to the next mobile phone, leading to improved charge efficiency.

FIG. 4 is a flowchart of a third exemplary operation of the battery charger 10A (or 10B) according to one embodiment of the present invention. In the embodiment illustrated in FIG. 4, all connected mobile phones can be efficiently charged by repeating the charge cycle one or more times.

At step S21, some charge parameters are set such as a timer value, a voltage level or the number of charge cycles. If it is determined that a currently targeted mobile phone has to be charged (S22: YES), the battery charger 10A (or 10B) starts to charge the mobile phone at step S23 and then determines whether the set charge parameters are satisfied at step S24. In this embodiment, the timer value may be set at 10 minutes, and thus the battery charger 10A (or 10B) may determine whether 10 minutes has passed. If the charge parameters are satisfied, the battery charger 10A (or 10B) determines whether the next mobile phone exists at step S25. On the other hand, if the mobile phone has sufficient battery charge and thus does not have to be charged (S22: NO), the battery charger 10A (or 10B) determines whether the next mobile phone exists at step S25.

After all the connected mobile phones have been charged in accordance with the charge parameters in the first cycle (S25: NO), the battery charger 10A (or 10B) determines whether the charge cycle has been performed predefined times at step S26. If the charge cycle has not been performed the predefined times, the process returns to step S22 for the start of the next charge cycle. In the next cycle, if one or more of the connected mobile phones have been fully or almost fully charged in the previous charge cycle, it is determined at step S22 that the fully or almost fully charged mobile phones do not have to be charged any more. Thus, the switching control unit 17 switches to the next mobile phone to be charged without selection of the charged mobile phones.

According to this embodiment, even in the case where multiple mobile phones having different levels of consumed batteries are charged in several cycles, the battery charger 10A (or 10B) can switch to the next mobile phone without charging an earlier fully-charged mobile phone any more, leading to improved uniform and efficient charging.

According to the present invention, as mentioned above, it is possible to charge multiple mobile phones uniformly and in better balance. Since a single battery charger only has to be connected to a commercial outlet, standby power can be reduced after charge completion compared to conventional arrangements where multiple battery chargers are connected to respective outlets. In addition, a lithium-ion battery free from battery degradation due to memory effect is commonly used in mobile phones. Thus, even if mobile phones having different levels of consumed batteries are supplementarily charged, the batteries experience no adverse effects.

The present invention has been described in conjunction with the certain embodiments but is not limited to the described embodiments. For example, multiple mobile phones are connected to the battery charger 10A or 10B via wired cables in the above-mentioned embodiments. However, the present invention can be applied to the case where mobile devices having a special type of battery capable of being charged wirelessly are charged. In this case, the battery charger 10A or 10B is configured to have multiple apertures and the respective mobile devices are accommodated in the apertures. Instead of wired cables and branch side connectors 16, a radio transceiver unit and an antenna are provided as mobile device interfaces. The condition detection unit 14 receives respective charge conditions detected by the mobile devices themselves via the radio transceiver unit. The charging unit 12 generates electromagnetic waves within an aperture using an interface selected by the switching control unit 17. When the electromagnetic waves are radiated to a coil in the battery of the mobile device, the current is induced within the battery, resulting in charging the mobile device.

Also in this case, when the charge parameters are satisfied and/or when the mobile device is fully charged, the battery charger 10A or 10B can switch to another mobile device by selecting the next aperture (interface). Thus, only the single battery charger 10A or 10B may be used to charge multiple mobile devices uniformly and sequentially.

Also, if a charge parameter is set to have "charge completion", the next mobile phone is not charged until the current mobile phone has been fully charged.

Also, the charge parameters may relate to the current value of the mobile phones as well as the battery voltage level.

In the embodiments, only the mobile phones have been described as an object to be charged. However, the object to be charged is not limited to the mobile phones and can be a CD player, a MD player, an electrical toothbrush or any other chargeable mobile device.

The present invention is not limited to the specifically disclosed embodiments, and variations and modifications may be made without departing from the scope of the present invention.

The present application contains subject matter related to Japanese patent application No. 2007-117202, filed in the JPO on Apr. 26, 2007, the entire contents of which are hereby incorporated herein by reference.

What is claimed is:

1. A battery charger, comprising:
    multiple interfaces provided corresponding to multiple mobile devices, the interfaces being connected to the mobile devices in wired or wireless connection;
    a charge parameter setting unit setting a number of charge cycles specified by a user for the mobile devices, the number of charge cycles being a number of cycles over which an equal amount of charge will be delivered to a mobile device of the user such that the mobile devices of the user is fully charged when the number of charge cycles is complete;
    a switching control unit switching timing of charging the multiple mobile devices based on the number of charge cycles specified by the user; and a
    a charging unit charging one of the mobile devices selected by the switching control unit via a corresponding interface, the charging unit charging each of the mobile devices intensively by a respective charge amount, the respective charge amount being a quotient derived from division of a required charge amount of a mobile device of the user divided by the number of charge cycles specified by the user.

2. The battery charger as claimed in claim 1, further comprising:
    a condition detection unit detecting a charge condition and/or a connection condition of each of the mobile devices; and
    a charge necessity determination unit determining whether each of the mobile devices has to be charged based on the detected condition,
    wherein when the charge necessity determination unit determines that one of the mobile devices does not have to be charged, the switching control unit skips the mobile device and selects a next one of the mobile devices.

3. The battery charger as claimed in claim 1, wherein the switching control unit determines whether the charge parameters set by the charge parameter setting unit are satisfied, and when the charge parameters are satisfied, the switching control unit switches to a next one of the mobile devices.

4. The battery charger as claimed in claim 1, further comprising:
    a charge condition detection unit detecting a charge condition of each of the mobile devices,
    wherein if the charge condition detection unit detects that a current one of the mobile devices has been fully charged, the switching control unit switches to a next one of the mobile devices even when the charge parameters have not been satisfied.

5. The battery charger as claimed in claim 1, wherein when the charge parameters are satisfied for one of the mobile devices as a result of a previous charge cycle, the switching control unit skips the one of the mobile devices in a current charge cycle.

6. The battery charger as claimed in claim 1, further comprising:
    a connector for receiving power from another battery charger.

7. The battery charger as claimed in claim 1, wherein the number of charge cycles is equal to two.

8. A method of charging multiple mobile devices, the method comprising:
    connecting the multiple mobile devices to a single battery charger in wired or wireless connection;
    setting a number of charge cycles specified by a user for each of the mobile devices, the number of charge cycles being a number of cycles over which an equal amount of charge will be delivered to a mobile device of the user such that the mobile device of the user is fully charged when the number of charge cycles is complete;
    switching timing of charging the mobile devices based on the number of charge cycles specified by the user; and
    charging one of the mobile devices selected in the switching step, the charging including charging each of the mobile devices intensively by a respective charge amount, the respective charge amount being a quotient derived from division of a required charge amount of a mobile device of the user divided by the number of charge cycles specified by the user.

9. The method as claimed in claim 8, further comprising:
    detecting a charge condition of each of the mobile devices,
    wherein if it is detected in the detecting step that a current one of the mobile devices has been fully charged, the charging is switched to a next one of the mobile devices in the switching step even when the charge parameters have not been satisfied.

* * * * *